March 29, 1932.   B. CHESTER   1,850,993
HELITRACTOR
Filed Oct. 9, 1929
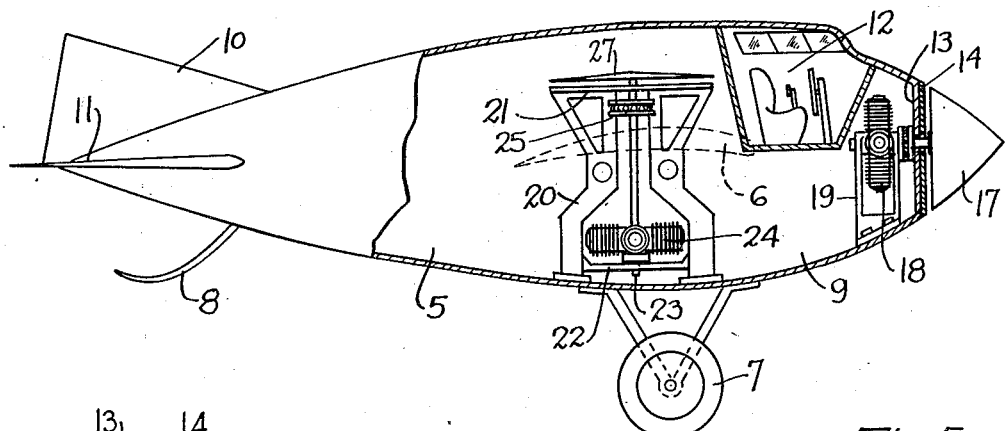
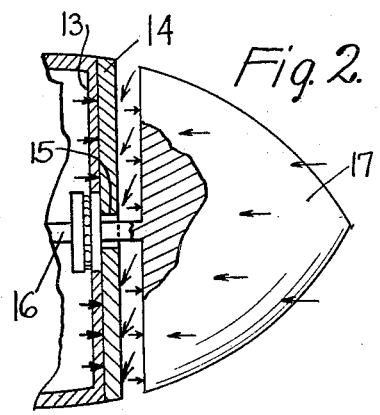
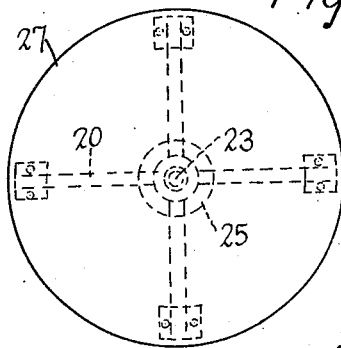
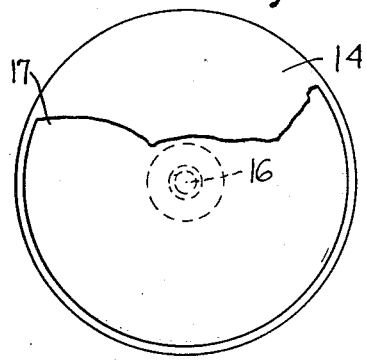
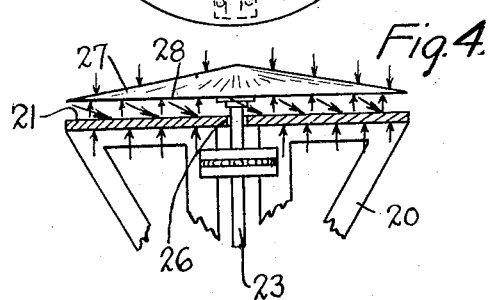
Inventor
BRYANT CHESTER
By His Attorney John J. Lynch Patented Mar. 29, 1932

1,850,993

UNITED STATES PATENT OFFICE

BRYANT CHESTER, OF BEACON, NEW YORK

HELITRACTOR

Application filed October 9, 1929. Serial No. 398,423.

This invention relates to aircraft and in particular to a device which takes advantage of some of the fundamental principles of aerodynamics which will enable the aircraft to rise vertically from the earth as well as propel the same forwardly.

A particular object of my invention is to provide in a heavier than air machine a rotating member used in conjunction with a stationary member and so arranged that air particles will through their action lower the effect of atmospheric pressure to advantage of one surface thus providing a vertical upward thrust which will lift the plane from the ground or will propel it through the air.

A still further and equally important object of my invention is to provide mechanism for taking advantage of certain fundamental principles of aerodynamics which may be readily incorporated in an aircraft and which will give to the aircraft all of the advantages of the helicopter and the regular plane propelling means without offering any resistance to the travel of the aircraft in flight.

Another important object of my invention is to provide a device in which a moving surface is arranged adjacent a stationary surface, the moving surface travelling at high speed so that velocity is imparted to air particles in the vicinity of the rotating surface whereby the velocity of these particles will tend to approach the rotating speed of the moving member tending to strike the stationary surface with an oblique blow so that the actual effect of atmospheric pressure on the stationary surface is reduced and the normal atmospheric pressure beneath the surface will lift the aircraft.

Reference is to be had to the accompanying drawings which illustrate as an example the preferred embodiment of my invention, in which drawings Figure 1 is a view in elevation of an aircraft in which has been incorporated my improved propelling means, part of the craft being shown in section to illustrate the relative positions of the driving and lifting members.

Figure 2 is a fragmentary view in section of the forward end of the plane showing the use of a rotor head, the under surface of which is adjacent a stator.

Figure 3 is an end view of the rotor head as illustrated in Figure 2.

Figure 4 is an enlarged view in elevation of the upper end of the vertically disposed or lifting rotor disk and its associated stator and, Figure 5 is a top plan view of my device as illustrated in Figure 4, the position of the frame legs being illustrated, Referring to the drawings in detail 5 indicates an aircraft of any particular formation employing the accepted wing structure 6, landing wheel 7, tail skid 8, body 9, rudder 10 and aileron 11, the operation of the craft being controlled from a suitable pilot chamber 12 which may be positioned in any suitable part of the craft.

In carrying out my invention I close the front end of the plane body with the wall 13 and to this wall I secure a stator disk 14, which may be made of light metal or other suitable wear resisting material. This stator which may be termed the vertical stator is provided with a central opening 15 through which passes a shaft 16. This shaft 16 carries exterior of the stator a rotor head 17 which is so shaped that it carries out the stream line effect of the craft and consequently offers little resistance to the passage of the ship through the air. The shaft 16 may be formed integrally with or may be secured in any suitable manner to the rotor head 17, it being sufficient to note that the shaft 16 is driven by the engine 18 which is mounted in a suitable frame 19 secured to the floor or bottom of the aircraft body 9. Any suitable type of motor power may be employed and an internal combustion engine of the approved type has been illustrated.

Within the interior of the body of the craft 9 I have provided a frame constituting the legs 20 which are secured in any suitable manner to the bottom of the craft and support a stator 21 which I may term the horizontal stator in order to distinguish it from the one used at the forward end of the plane. This stator may be of any suitable material and may be secured in any suitable manner to the upper end of the frame legs 20. The frame legs 20 near their bottom are connected by a suitable motor supporting web 22 through which passes the lower end of the drive shaft 23. This shaft is rotated through the medium of the motor 24 which is of any accepted type and is positioned within the frame which is made of the lightest possible construction consistent with strength but rigid enough to support the stator plate 21 in its proper position. The upper end of the frame 21 supports the thrust bearing 25 and the shaft 23 where it passes through the opening 26 in the stator plate or disk 21 is secured to or formed integral with the rotor disk 27. This disk is preferably made thicker at its center in order to withstand the centrifugal force of its peripheral portion inasmuch as the disk rotates at very high speed and its under surface 28 being only slightly spaced from the upper surface of the stator disk 21 carries out the function to be hereinafter described.

As particularly indicated in Figure 4 the rotor disk 27 mounted to the shaft 23 rotates at high speed because the shaft is driven by the engine 24. It will be particularly noticed that the rotor disk 27 and the rotor head 17 are of solid construction and do not resemble a fan in any respect, the invention being a departure from the usual helicopter idea but achieving the same end in the vertical and horizontal flight of a heavier than air machine. The stator disk 21 and rotor disk 27 may be of substantially the same diameter or size as the stator disk 21 but would not necessarily have to be circular in shape. The distance between the under surface of the rotor disk 27 or rotor head 17 and the upper or outer surface of the stator disk 21 or disk 14 is reduced to a practical minimum. The principle involved in producing a vertical thrust may be described as follows:

Consider the rotating disk to be revolving at very high speed. The air particles immediately associated with the surfaces of the rotating disk will tend to be dragged along at the same velocity of the disk thus imparting velocity to the air particles in the immediate vinicity of the rotating surface as indicated by the arrow, it being understood that this description fits both the vertical and horizontal applications of my invention. The velocity of these particles will tend to approach that of the rotating disk. If the under rotating surface be brought as close as is practically possible to the upper plane surface of the stator disk, the air particles set in motion by the rotor disk will tend to strike the surface of the stator disk with an oblique blow. This action of the air particles striking obliquely on the upper surface of the stator will lower the actual effective atmospheric pressure on this upper surface of the stator. This reduction of pressure is due to the fact that an oblique blow is less effective than a direct blow. It is this fact rather than the production of any partial vacuum that produces the desired decrease in pressure. With a decrease in pressure on the upper surface of the stator, the action of the normal atmospheric pressure on the underside of the stator will overcome that of the upper reduced pressure and will cause the stator to have a vertical thrust upwardly and consequently its desired tendency to rise will elevate the craft.

As the pressures on the upper and lower surfaces of the rotor are equal a thrust action in any direction is consequently nullified. Therefore, since the whole machine is as a unit the excess of the atmospheric pressure on the underside of the stator exceeds that of the pressure of the upper surface of the stator and consequently the machine will rise vertically providing the rotating velocity of the rotor is sufficient and the distance between the stator and the rotor is reduced to a crucial minimum.

It is also to be noted that this action may be utilized to produce the desired forward horizontal thrust such as is accomplished by the present day propellers. The advantage to be obtained are greater efficiency and better overall stream line design. In this respect the same action that has been explained is carried out between the stator 14 and the rotor head 17.

It is evident therefore that I have provided a machine which I term a helitractor, the invention providing a helicopter action and a tractive force which combined will not only raise the craft from the ground but will give it the forward thrust for travel.

It is evident therefore that I have provided a machine which employs certain fundamental principles of aerodynamics which will enable the machine to rise vertically from the earth and maintain any practical altitude under its own motive power.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

1. In an aircraft, a stator having a plane surface, a rotor having a plane surface, the rotor being shaped to conform with the aircraft and constituting an end thereof, a shaft for the rotor, means for revolving the shaft, and the plane surface of said rotor and stator being separated a minimum workable distance.

2. An aircraft compelling means comprising a fixed stator having a smooth face, a rotor substantially conical in shape and having a smooth outer surface and face adjacent the stator face, both the rotor and stator faces being substantially of the same area, and slightly separated to constitute an air space, and means for revolving the rotor.

In testimony whereof I, BRYANT CHESTER, have signed my name to this specification, this 30th day of August, 1929.

BRYANT CHESTER. [L. S.]